United States Patent
Basra et al.

(10) Patent No.: US 10,721,287 B2
(45) Date of Patent: Jul. 21, 2020

(54) REAL-TIME FILE REPAIR

(71) Applicant: Verizon Patent and Licensing Inc., Arlington, VA (US)

(72) Inventors: Arvind Basra, Glen Ridge, NJ (US); Mansoor Ali Shah Mohammed, Plano, TX (US); Robert Kaphan, Bloomsbury, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 203 days.

(21) Appl. No.: 15/934,295

(22) Filed: Mar. 23, 2018

(65) Prior Publication Data

US 2019/0297135 A1   Sep. 26, 2019

(51) Int. Cl.
| | |
|---|---|
| H04L 29/08 | (2006.01) |
| H04L 12/26 | (2006.01) |
| H04L 12/18 | (2006.01) |
| H04W 4/06 | (2009.01) |
| H04L 29/06 | (2006.01) |
| G06F 11/14 | (2006.01) |

(52) U.S. Cl.
CPC .......... *H04L 67/06* (2013.01); *G06F 11/1402* (2013.01); *H04L 12/189* (2013.01); *H04L 43/0823* (2013.01); *H04L 65/4076* (2013.01); *H04L 67/02* (2013.01); *H04W 4/06* (2013.01)

(58) Field of Classification Search
CPC ............ G06F 11/1402; G06F 11/1415; G06F 11/2365; H04L 67/02; H04L 67/06; H04L 65/4076

See application file for complete search history.

(56) References Cited

U.S. PATENT DOCUMENTS

| | | | | |
|---|---|---|---|---|
| 2014/0307734 | A1* | 10/2014 | Luby ...................... | H04L 12/18 370/390 |
| 2017/0302403 | A1* | 10/2017 | Cao ......................... | H04L 12/18 |
| 2017/0364550 | A1* | 12/2017 | Pazos ...................... | H04L 67/16 |
| 2018/0309527 | A1* | 10/2018 | Deshpande ............ | H04H 60/35 |

* cited by examiner

*Primary Examiner* — Jigar P Patel (57) ABSTRACT

A device receives a packet, of multiple packets, relating to a file being delivered via multicast, and a file delivery table associated with the file. The file delivery table includes uniform resource identifiers corresponding to respective sources of the file. The device determines that one or more portions of the file, that are included in the packet, are in need of repair after receiving the packet. The device provides, to a respective source corresponding to a uniform resource identifier, a request for data relating to the one or more portions of the file based on determining that the one or more portions of the file are in need of repair, receives the data from the respective source based on the request, and processes the data to repair the one or more portions of the file while one or more other packets of the multiple packets are being received.

20 Claims, 8 Drawing Sheets

FIG. 5B

REAL-TIME FILE REPAIR

BACKGROUND

Wireless networks allocate base station resources for different services, such as voice services, unicast services, broadcast services, and multicast services. Evolved multimedia broadcast multicast service (eMBMS) (e.g., in a long term evolution (LTE) multicast network) provides efficient delivery by allowing streaming content (e.g., video-on-demand content, firmware over the air (FOTA) content, and/or the like) to be sent once and received by many end users using a multicast stream (e.g., according to the File Delivery over Unidirectional Transport (FLUTE) protocol).

DETAILED DESCRIPTION OF PREFERRED EMBODIMENTS

The following detailed description of example implementations refers to the accompanying drawings. The same reference numbers in different drawings can identify the same or similar elements.

Evolved multimedia broadcast multicast service (eMBMS) permits streaming content to be delivered once, and received by multiple end users, via a multicast stream. This is more efficient than unicast streams, where the same content is sent to each user device individually. However, when portions of a file, received in connection with eMBMS, are in need of repair, the file delivery process can fail.

Some implementations, described herein, provide a device (e.g., a user device) that is capable of performing real-time repair of a file being provided via multicast. In some implementations, the device is capable of performing the repair without having to wait for the file delivery process to complete (and without having to wait for an offset time interval to expire). In this way, the device can repair received portions of a file as other portions of the file are being received, which enables the device to identify and address issues with the file in real-time during the file delivery process. This permits the device to utilize the file much more quickly upon completion of the file delivery process, and reduces or eliminates the possibility of a delivery failure that might otherwise occur as a result of undue delay in repairing the file, which conserves network resources. Furthermore, this reduces or eliminates a need for the device to receive, process, and store damaged or unusable files, which conserves power, computing resources, and memory resources of the device.

Figure 1A:
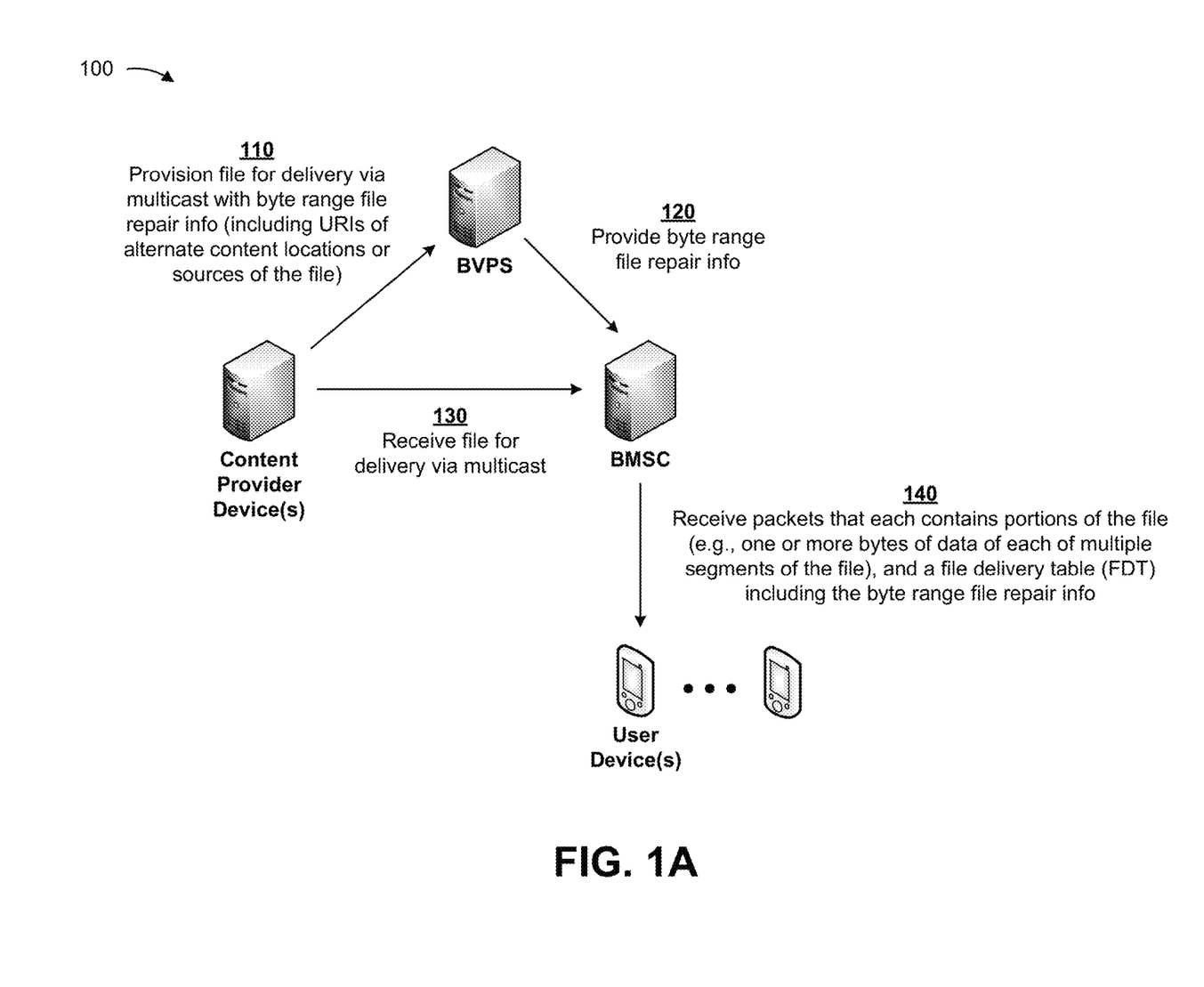
FIGS. 1A-1C are diagrams of an overview of an example implementation described herein.
Figure 1B:
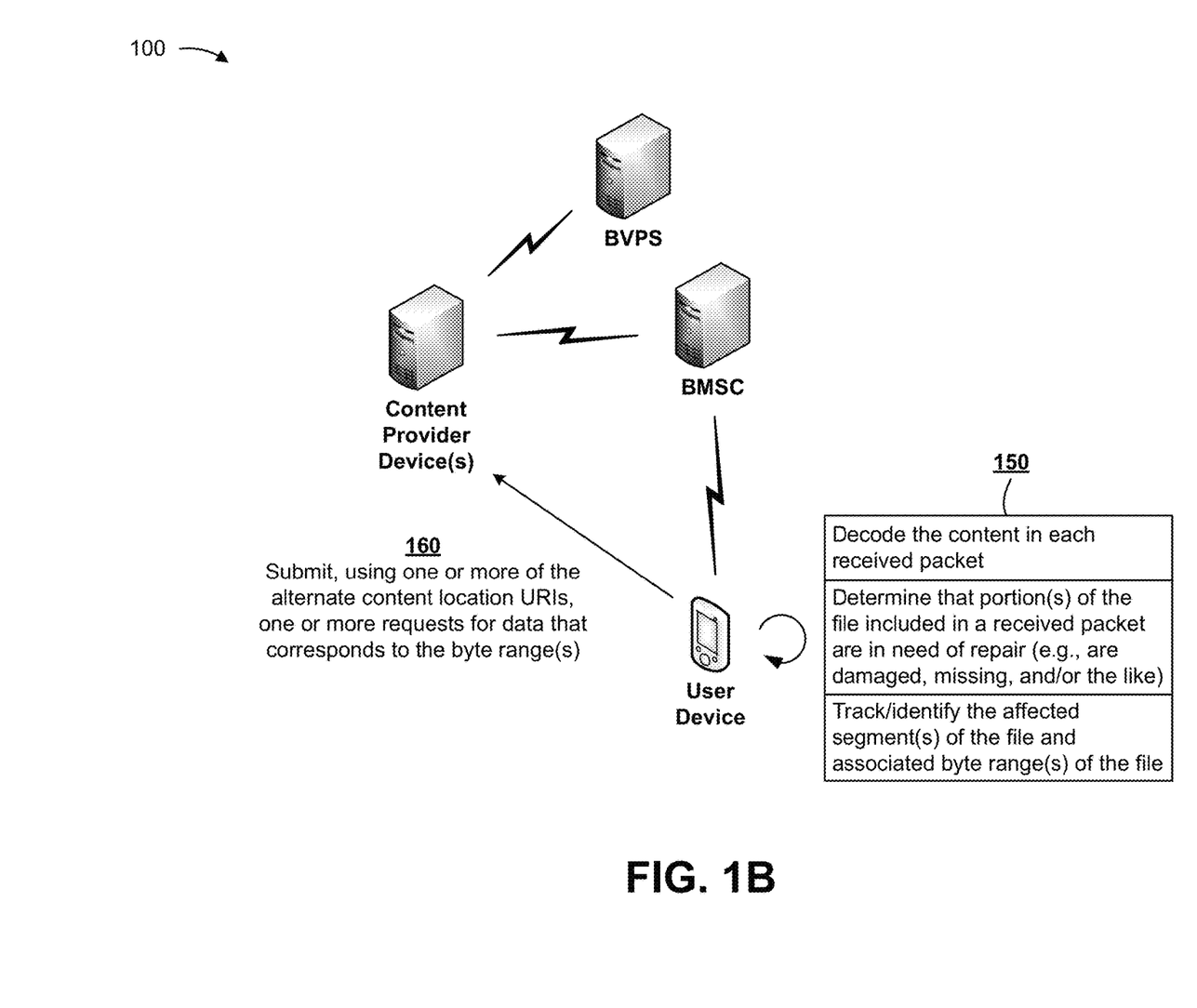
Figure 1C:
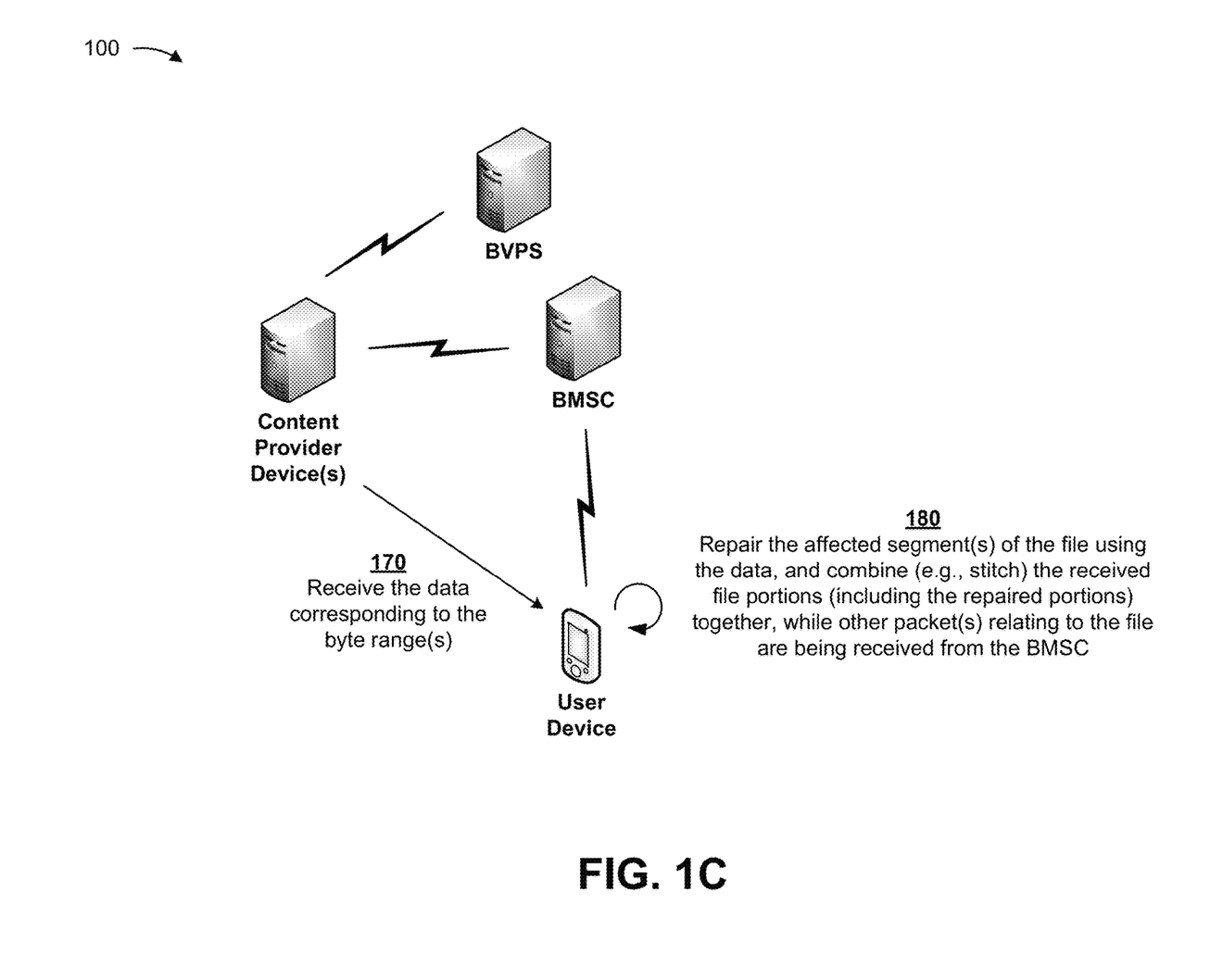

FIGS. 1A-1C are diagrams of an overview of an example implementation 100 described herein.

As shown in FIGS. 1A-1C, example implementation 100 can include user device(s), content provider device(s), a Broadcast-Multicast Service Center (BMSC) device, and a broadcast video provisioning system (BVPS). In some implementations, each user device can be associated with a subscriber of wireless telecommunications services provided by a network provider. In some implementations, the user device(s) can include middleware that is capable of processing multicast streams. In some implementations, the network provider can utilize the BMSC and the BVPS, among other devices, to provide multicast services.

As shown in FIG. 1A, and as shown by reference number 110, the content provider device(s) can provision a file for delivery via multicast with byte range file repair information (including uniform resource identifiers (URIs) of alternate content locations or sources of the file). In some implementations, the file can be provisioned for delivery in accordance with a file schedule (e.g., a time (a service schedule) during which the file is to be delivered) and/or the like.

As shown by reference number 120, the BVPS can provide the byte range file repair information (e.g., including the URIs of alternate content locations or sources of the file) to the BMSC. In some implementations, the BVPS can provide the byte range file repair information via one or more application program interfaces (APIs) associated with a northbound (NB) interface (e.g., based on NB addContent request(s)).

As shown by reference number 130, the BMSC can receive, from the content provider device(s), the file for delivery via multicast. As shown by reference number 140, the user device(s) can receive packets that each contains portions of the file (e.g., one or more bytes of data of each of multiple segments of the file), and a file delivery table (FDT) (e.g., a FLUTE FDT) that includes the byte range file repair information.

As shown in FIG. 1B, and as shown by reference number 150, one of the user devices can decode the content in each received packet, determine that portion(s) of the file included in a received packet are in need of repair (e.g., are damaged, missing, and/or the like), and track and/or identify the affected segment(s) of the file and the associated byte range(s) of the file. In some implementations, the user device can perform such actions while other packets relating to the file are being received from the BMSC.

As shown by reference number 160, the user device can submit, using one or more of the alternate content location URIs, one or more requests for data that corresponds to the byte range(s). In some implementations, the user device can utilize a hypertext transfer protocol (HTTP) proxy instance to track and/or identify the affected file segments and the associated byte range(s), and to submit the request(s).

In some implementations, the user device can submit a request periodically (e.g., once per 5 seconds, once per 10 seconds, and/or the like, depending on the file schedule and/or a guaranteed bit rate (GBR) associated with the multicast service). This permits identified byte ranges to accumulate before sending each request, which avoids potential overloading of the content provider device(s) with numerous byte range requests (e.g., in a case where numerous portions of the file need to be repaired).

As shown in FIG. 1C, and as shown by reference number 170, the user device can receive the data corresponding to the byte range(s). As shown by reference number 180, the user device can repair the affected segment(s) of the file using the data, and combine (e.g., stitch) the received file portions (including the repaired portions) together, all while additional packet(s) relating to the file are being received from the BMSC. In some implementations, after all the packets relating to the file are received (and repaired, if needed), the user device can perform final processing and complete the combining of the file portions to derive the file.

In this way, the user device can repair received portions of a file as other portions of the file are being received, which enables the user device to identify and address issues with the file in real-time during the file delivery process. This permits the user device to utilize the file much more quickly upon completion of the file delivery process, and reduces or eliminates the possibility of a delivery failure that might otherwise occur as a result of undue delay in repairing the file, which conserves network resources. Furthermore, this reduces or eliminates a need for the user device to receive, process, and store damaged or unusable files, which conserves power, computing resources, and memory resources of the user device.

As indicated above, FIGS. 1A-1C are provided merely as examples. Other examples are possible and can differ from what was described with regard to FIGS. 1A-1C. For example, although some implementations are described herein with respect to delivery and byte range file repair of a single file (e.g., a first profile for byte range file repair), the implementations can be applied similarly or equally to delivery and byte range file repair of multiple files (e.g., a second profile for byte range file repair), as described in more detail elsewhere herein.

Figure 2:
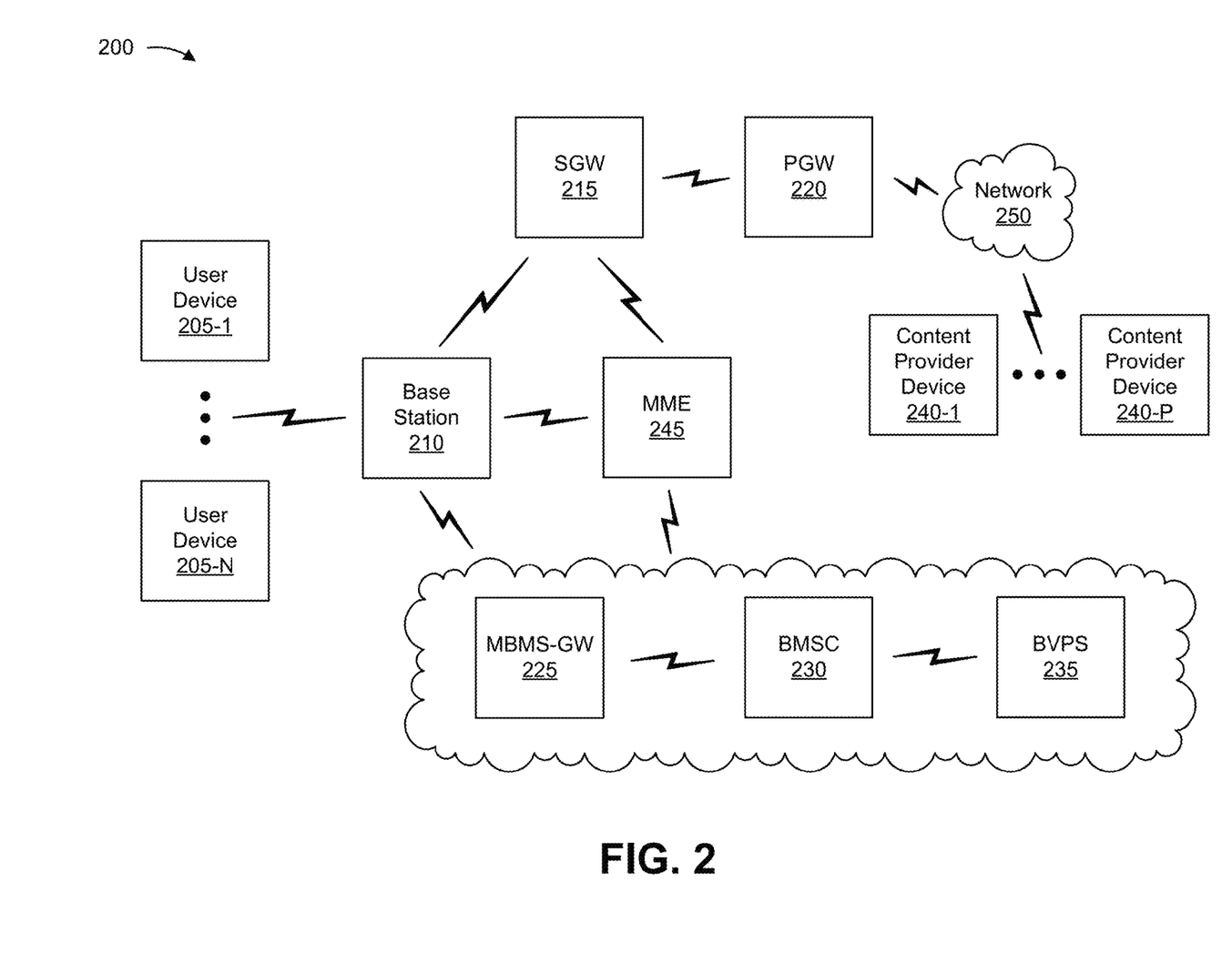
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more user devices 205-1 through 205-N (N≥1) (hereinafter referred to collectively as "user devices 205," and individually as "user device 205"), a base station 210, a serving gateway (SGW) 215, a packet data-network gateway (PGW) 220, a Multimedia Broadcast/Multicast Service Gateway (MBMS-GW) 225, a BMSC 230, a BVPS 235, one or more content provider devices 240-1 through 240-P (P≥1) (hereinafter referred to collectively as "content provider devices 240," and individually as "content provider device 240"), a mobility management entity device (MME) 245, and/or a network 250. Devices of environment 200 can interconnect via wired connections, wireless connections, or a combination of wired and wireless connections.

User device 205 includes one or more devices capable of communicating with base station 210 and/or a network (e.g., network 250). For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. User device 205 can send traffic to and/or receive traffic from network 250 (e.g., via base station 210, SGW 215, and/or PGW 220).

Base station 210 includes one or more devices capable of transferring traffic, such as audio, video, text, and/or other traffic, destined for and/or received from user device 205. In some implementations, base station 210 can include an Evolved Node B (eNodeB or eNB) associated with an LTE network that receives traffic from and/or sends traffic to network 250 via SGW 215 and/or PGW 220. Additionally, or alternatively, one or more base stations 210 can be associated with a radio access network (RAN) that is not associated with the LTE network. Base station 210 can send traffic to and/or receive traffic from user device 205 via an air interface. In some implementations, base station 210 can include a small cell base station, such as a base station of a microcell, a picocell, and/or a femtocell.

SGW 215 includes one or more devices capable of routing packets. For example, SGW 215 can include a traffic transfer device, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 215 can aggregate traffic received from one or more base stations 210 associated with the LTE network, and can send the aggregated traffic to network 250 (e.g., via PGW 220) and/or other network devices associated with an evolved packet core (EPC) and/or an Internet Protocol Multimedia Subsystem (IMS) core. SGW 215 can also receive traffic from network 250 and/or other network devices, and can send the traffic to user device 205 via base station 210. Additionally, or alternatively, SGW 215 can perform operations associated with handing off user device 205 to and/or from an LTE network.

PGW 220 includes one or more devices capable of providing connectivity for user device 205 to external packet data networks. For example, PGW 220 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 220 can aggregate traffic received from one or more SGWs 215, and can send the aggregated traffic to network 250. Additionally, or alternatively, PGW 220 can receive traffic from network 250, and can send the traffic to user device 205 via SGW 215 and base station 210. PGW 220 can record data usage information (e.g., byte usage).

MBMS-GW 225 includes one or more devices capable of routing packets related to a multicast stream or a broadcast stream. For example, MBMS-GW 225 can include a traffic transfer device, such as a gateway, a router, a modem, a switch, a firewall, a NIC, a hub, a bridge, a server device, an OADM, or any other type of device that processes and/or transfers traffic. MBMS-GW 225 can receive traffic from network 250 and/or other network devices, and can send the received traffic (e.g., streaming content) to user device 205 via base station 210.

BMSC 230 includes one or more devices capable of receiving, generating, storing, processing, and/or providing information associated with providing a broadcast or multicast service. For example, BMSC 230 can include a server device, a traffic transfer device (e.g., a router, a switch, a hub, etc.), or a similar device. In some implementations, BMSC 230 can allocate bandwidth for providing a broadcast or a multicast service, and/or can instruct other devices associated with providing the broadcast or multicast service.

BVPS 235 includes one or more devices capable of receiving, generating, storing, processing, and/or providing information associated with providing a broadcast or multicast service. For example, BVPS 235 can include a server device, a traffic transfer device (e.g., a router, a switch, a hub, etc.), or a similar device. In some implementations, BVPS 235 can provision an eMBMS by communicating with BMSC 230. BVPS 235 can create broadcast and/or multicast services.

Content provider device 240 includes one or more devices capable of receiving, generating, storing, processing, and/or providing streaming content. For example, content provider device 240 can include a computing device, such as a server device (e.g., a web server, a proxy server, etc.), a network device, or a similar device.

MME 245 includes one or more devices, such as one or more server devices, capable of managing authentication, activation, deactivation, and/or mobility functions associated with user device 205. In some implementations, MME 245 can perform operations relating to authentication of user device 205. Additionally, or alternatively, MME 245 can facilitate the selection of a particular SGW 215 and/or a particular PGW 220 to serve traffic to and/or from user device 205. MME 245 can perform operations associated with handing off user device 205 from a first base station 210 to a second base station 210 when user device 205 is transitioning from a first cell associated with the first base station 210 to a second cell associated with the second base station 210. Additionally, or alternatively, MME 245 can select another MME (not pictured), to which user device 205 should be handed off (e.g., when user device 205 moves out of range of MME 245).

Network 250 includes one or more wired and/or wireless networks. For example, network 250 can include a cellular network (e.g., an LTE network, a 3G network, a code division multiple access (CDMA) network, etc.), a public land user network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
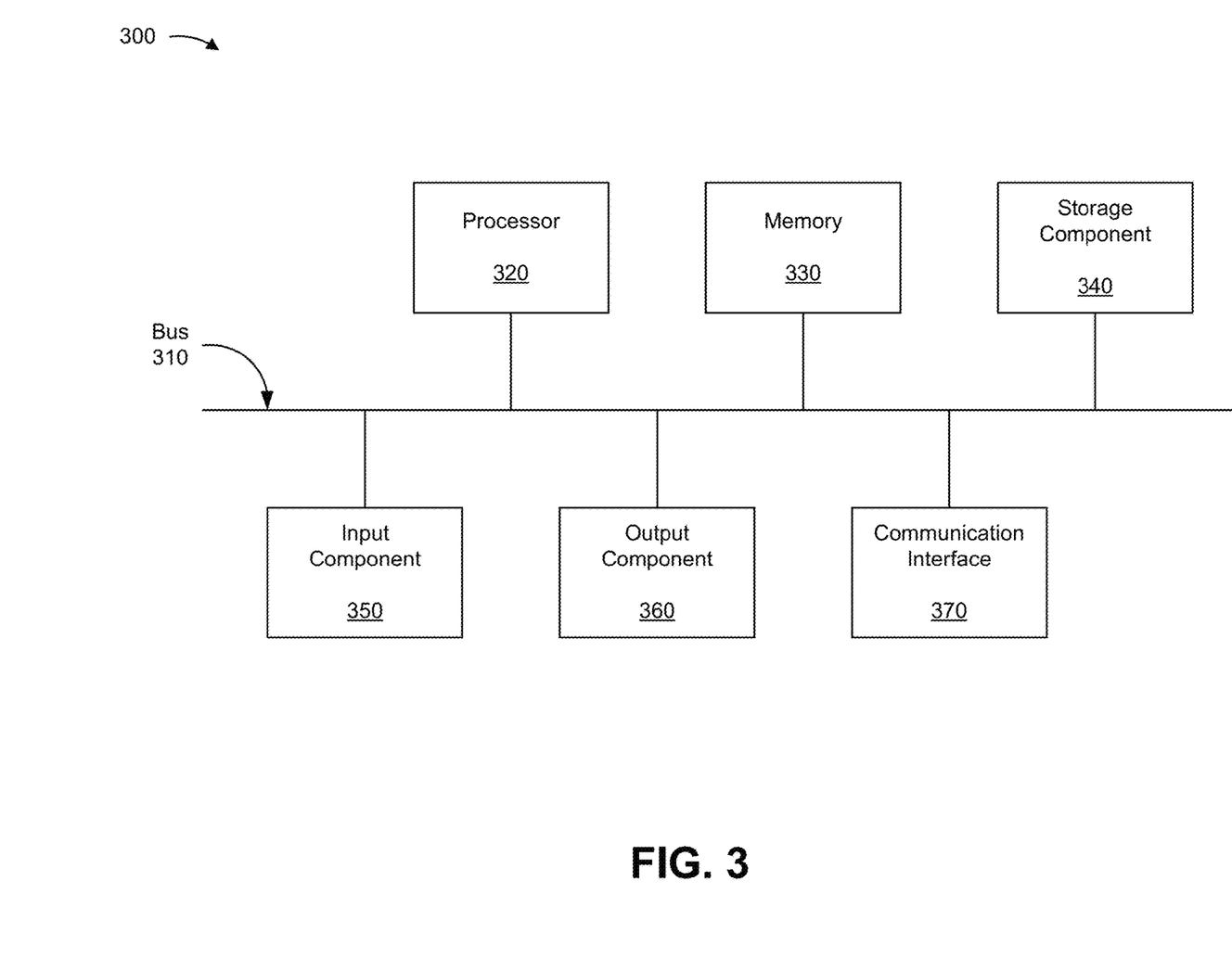
FIG. 3 is a diagram of example components of one or more devices of FIG. 2.

FIG. 3 is a diagram of example components of a device 300. Device 300 can correspond to user device 205, base station 210, SGW 215, PGW 220, MBMS-GW 225, BMSC 230, BVPS 235, content provider device 240, and/or MME 245. In some implementations, user device 205, base station 210, SGW 215, PGW 220, MBMS-GW 225, BMSC 230, BVPS 235, content provider device 240, and/or MME 245 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
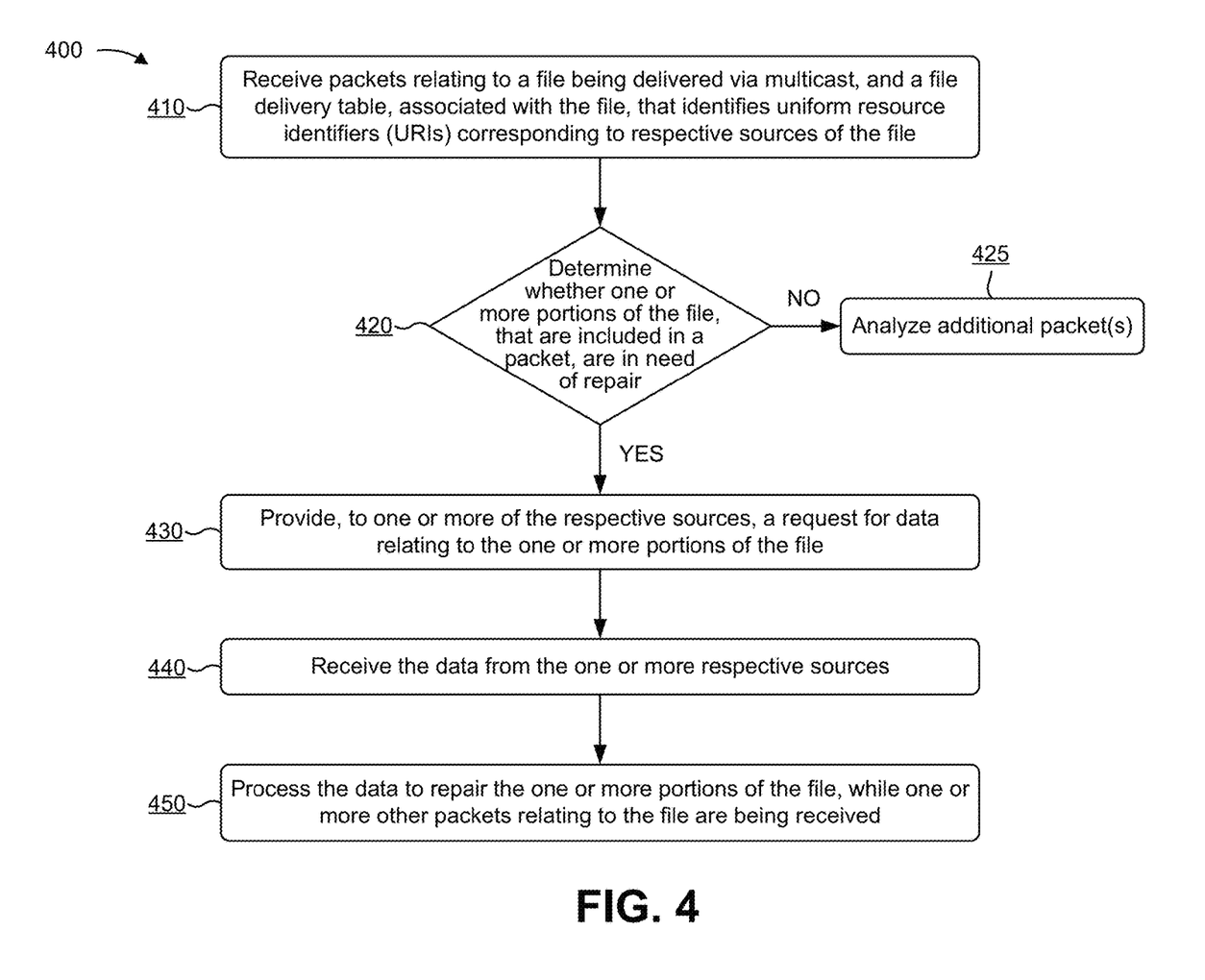
FIG. 4 is a flow chart of an example process for performing real-time file repair.

FIG. 4 is a flow chart of an example process 400 for performing real-time file repair. In some implementations, one or more process blocks of FIG. 4 can be performed by user device 205. In some implementations, one or more process blocks of FIG. 4 can be performed by another device or a group of devices separate from or including user device 205, such as base station 210, SGW 215, PGW 220, MBMS-GW 225, BMSC 230, BVPS 235, content provider device 240, and/or MME 245.

As shown in FIG. 4, process 400 can include receiving packets relating to a file being delivered via multicast, and a file delivery table, associated with the file, that identifies URIs corresponding to respective sources of the file (block 410). For example, user device 205 (e.g., using processor 320, memory 330, storage component 340, communication interface 370, and/or the like) can receive, from BMSC 230, packets relating to a file being delivered via multicast, and a file delivery table, associated with the file, that identifies URIs corresponding to respective sources of the file. In practice, user device 205 can receive thousands, millions, billions, etc. of packets relating to thousands, millions, billions, etc. of files being delivered via multicast. In this way, user device 205 can receive packets relating to files in a manner that cannot be performed manually or objectively by a human actor.

In some implementations, user device 205 can receive the packets and the file delivery table in a manner that is the same as or similar to that described above with respect to FIGS. 1A-1C. For example, user device 205 can receive packets relating to a file being delivered via an eMBMS. In some implementations, BVPS 235 can provision the file for delivery (e.g., in accordance with a file schedule), BMSC 230 can obtain the file and byte range file repair information (e.g., including the URIs of alternate content locations or sources of the file).

In this way, user device 205 can receive packets relating to a file being delivered via multicast, and a file delivery table, associated with the file, that identifies URIs corresponding to respective sources of the file, which can enable user device 205 to determine whether one or more portions of the file, that are included in a packet, are in need of repair.

As further shown in FIG. 4, process 400 can include determining whether one or more portions of the file, that are included in a packet, are in need of repair (block 420). For example, user device 205 (e.g., using processor 320, memory 330, storage component 340, and/or the like) can determine whether one or more portions of the file, that are included in a packet, are in need of repair. In practice, user device 205 can perform determinations relating to thousands, millions, billions, etc. of files. In this way, user device 205 can perform determinations relating to files in a manner that cannot be performed manually or objectively by a human actor.

In some implementations, user device 205 can determine whether the one or more portions of the file, that are included in a packet, are in need of repair, in a manner that is the same as or similar to that described above with respect to FIGS. 1A-1C. For example, user device 205 can determine whether portion(s) of the file, included in the packet, are in need of repair (e.g., are damaged, missing, and/or the like) while other packets relating to the file are being received.

In this way, user device 205 can determine whether one or more portions of the file, that are included in a packet, are in need of repair, which can enable user device 205 to analyze additional packet(s), or to provide, to one or more of the respective sources, a request for data relating to the one or more portions of the file.

As further shown in FIG. 4, if one or more portions of the file, that are included in the packet, are not in need of repair (block 420—NO), process 400 can include analyzing additional packet(s) (block 425). For example, user device 205 (e.g., using processor 320, memory 330, storage component 340, and/or the like) can analyze additional received packet(s) for portions of the file that are in need of repair. In practice, user device 205 can analyze thousands, millions, billions, etc. of packets. In this way, user device 205 can analyze packets in a manner that cannot be performed manually or objectively by a human actor.

As further shown in FIG. 4, if one or more portions of the file, that are included in the packet, are in need of repair (block 420—YES), process 400 can include providing, to one or more of the respective sources, a request for data relating to the one or more portions of the file (block 430). For example, user device 205 (e.g., using processor 320, memory 330, storage component 340, communication interface 370, and/or the like) can provide, to one or more of the respective sources (e.g., to one or more content provider devices 240), a request for data relating to the one or more portions of the file. In practice, user device 205 can provide thousands, millions, billions, etc. of requests for data to thousands, millions, billions, etc. of sources. In this way, user device 205 can provide requests for data in a manner that cannot be performed manually or objectively by a human actor.

In some implementations, user device 205 can track and/or identify the affected segment(s) of the file and the associated byte range(s) of the file. In some implementations, user device 205 can provide the request for data relating to the one or more portions of the file in a manner that is the same as or similar to that described above with respect to FIGS. 1A-1C. For example, user device 205 can include, in the request, information regarding the byte range(s) associated with the one or more portions of the file. In some implementations, user device 205 can provide the request prior to an expiration of the file schedule.

In this way, user device 205 can provide, to one or more of the respective sources, a request for data relating to the one or more portions of the file, which can enable user device 205 to receive the data from the one or more respective sources.

As further shown in FIG. 4, process 400 can include receiving the data from the one or more respective sources (block 440). For example, user device 205 (e.g., using processor 320, memory 330, storage component 340, communication interface 370, and/or the like) can receive the data from the one or more respective sources (e.g., from one or more content provider devices 240). In practice, user device 205 can receive thousands, millions, billions, etc. of data elements from thousands, millions, billions, etc. of sources. In this way, user device 205 can receive data from sources in a manner that cannot be performed manually or objectively by a human actor.

In some implementations, user device 205 can receive the data from the one or more respective sources in a manner that is the same as or similar to that described above with respect to FIGS. 1A-1C. For example, user device 205 can receive the data corresponding to the byte range(s) associated with the one or more portions of the file.

In this way, user device 205 can receive the data from the one or more respective sources, which can enable user device 205 to process the data to repair the one or more portions of the file while one or more other packets relating to the file are being received.

As further shown in FIG. 4, process 400 can include processing the data to repair the one or more portions of the file while one or more other packets relating to the file are being received (block 450). For example, user device 205 (e.g., using processor 320, memory 330, storage component 340, and/or the like) can process the data to repair the one or more portions of the file while one or more other packets relating to the file are being received. In practice, user device 205 can process data relating to thousands, millions, billions, etc. of files. In this way, user device 205 can process data relating to files in a manner that cannot be performed manually or objectively by a human actor.

In some implementations, user device 205 can process the data to repair the one or more portions of the file in a manner that is the same as or similar to that described above with respect to FIGS. 1A-1C. For example, user device 205 can repair the affected segment(s) of the file using the data and combine the file portions (including the repaired portions), while other packet(s) relating to the file are being received from BMSC 230. In some implementations, after all the packets relating to the file have been received (and repaired, if needed), user device 205 can perform final processing and complete the combining of the file portions to derive the file.

In this way, user device 205 can process the data to repair the one or more portions of the file in real-time (while other packets relating to the file are still being received).

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5A:
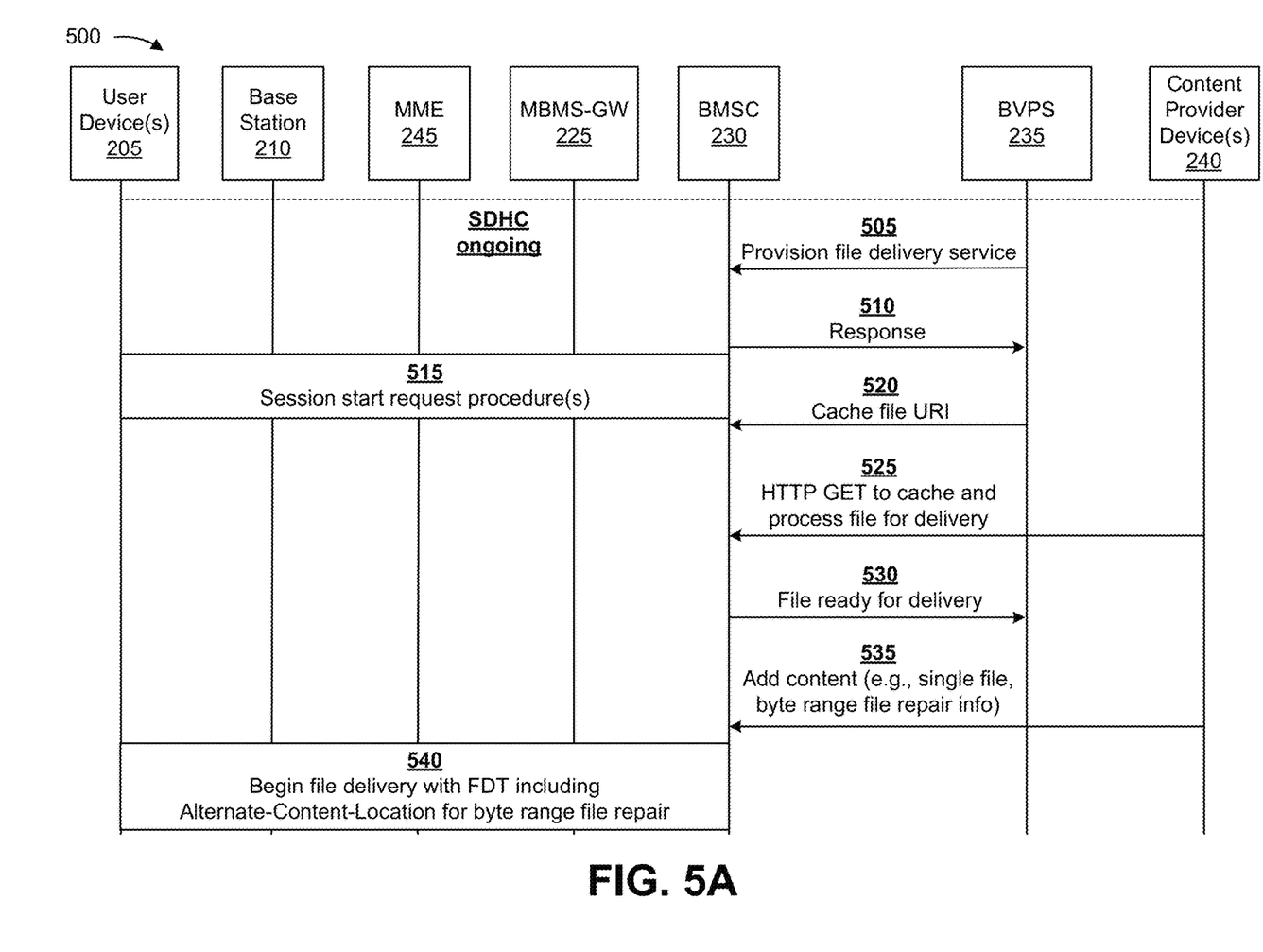
FIGS. 5A and 5B are signal diagrams of an example implementation relating to the example process shown in FIG. 4.
Figure 5B:
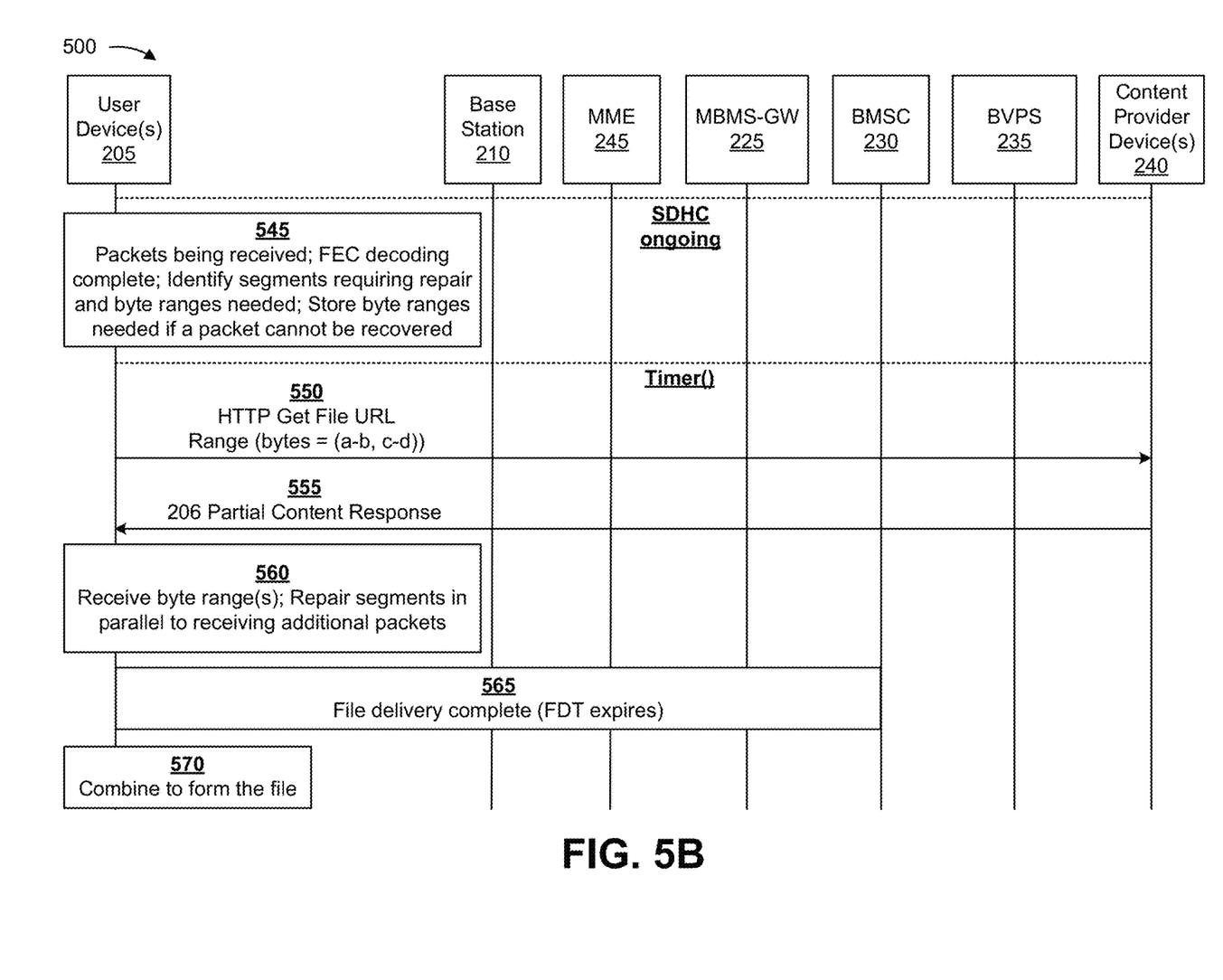

FIGS. 5A and 5B are signal diagrams of an example implementation 500 relating to example process 400 shown in FIG. 4.

As shown in FIG. 5A, and as shown by reference number 505, BVPS 235 can provision file delivery service resources (e.g., including information identifying a session ID, a temporary mobile group identity (TMGI), and/or the like) to BMSC 230. As shown by reference number 510, BMSC 230 can send a response based on the provisioning. As shown by reference number 515, user device(s) 205, base station 210, MME 245, MBMS-GW 225, and/or BMSC 230 can undergo session start request procedure(s) (e.g., in accordance with 3rd Generation Partnership Project (3GPP) multicast standard(s)). In some implementations, and as shown in FIG. 5A, service discovery/delivery channel (SDCH) related programming can be ongoing.

As shown by reference number 520, BVPS 235 can configure the content—e.g., file—for caching at BMSC 230 prior to delivery of the file (e.g., by caching the file's URI). As shown by reference number 525, BMSC 230 can obtain the file from content provider device 240 (e.g., via an HTTP GET request), cache the file, and process the file (e.g., BMSC 230 can perform FLUTE processing, forward error correction (FEC) processing, and/or the like). As shown by reference number 530, BMSC 230 can send a notification to BVPS 235 (e.g., after processing the file) indicating that the file is ready for delivery.

As shown by reference number 535, BVPS 235 can (e.g., at the time of delivery of the file) configure BMSC 230 to deliver the file (e.g., over an LTE multicast session), with byte-range-based file repair information, in accordance with a file schedule (e.g., a service schedule or time during which the file is to be delivered) and/or the like. As shown by reference number 540, BMSC 230 can deliver the file to user device(s) 205 along with an FDT that specifies alternate content location information (e.g., URIs for "Alternate-Content-Location-1" and "Alternate-Content-Location-2" that correspond to various content provider devices (e.g., one or more content provider devices 240)) for byte-range-based file repair purposes. The FDT can additionally specify one or more other parameters relating to the file, such as a name of the file, a size of the file, a type of the file, and/or the like.

As shown in FIG. 5B, and as shown by reference number 545, a user device 205 can receive packets that contain portions of the file, perform FEC decoding, identify, in each packet, any portions of the file (e.g., one or more bytes of data included in segments of the file) that need to be repaired (e.g., are damaged or missing), and track and/or identify the affected segment(s) of the file and the associated byte range(s) of the file. In some implementations, if user device 205 is unable to self-repair a byte range of the file, user device 205 can store information regarding the byte range.

As shown by reference number 550, user device 205 can select (e.g., randomly or in a predefined order) a first URI (e.g., for "Alternate-Content-Location-1") specified in the FDT, and send a request (e.g., an HTTP GET request), with information regarding the byte range(s) (e.g., a list of byte range(s)) that need to be repaired, to a content provider device 240 associated with the first URI. In some implementations, user device 205 can initiate a timer (e.g., at a time when a first byte range, that needs to be repaired, is identified and/or the like), and can continue to identify byte ranges that need to be repaired (if any) and store information regarding such byte ranges until the timer expires, after which user device 205 can send the request. In some implementations, upon, or after, sending the request, user device 205 can reinitiate the timer, identify subsequent byte ranges that need to be repaired, and so on. In some implementations, if user device 205 does not receive, or fails to receive, a response from content provider device 240 based on the request—e.g., an initial request—and/or receives an error (such as a "503 Service Unavailable" error), user device 205 can select (e.g., immediately) a second URI (e.g., for "Alternate-Content-Location-2") specified in the FDT, and send a request (e.g., an HTTP GET request), with information regarding the byte range(s) that need to be repaired, to a content provider device 240 associated with the second URI. In some implementations, if user device 205 does not receive a response from the content provider device 240 associated with the second URI (and/or receives an error, such as a "503 Service Unavailable" error), user device 205 can attempt (e.g., immediately) to perform symbol-based repair of the file.

As shown by reference number 555, a content provider device 240 (e.g., associated with the first or second URI) can respond (e.g., via a "206 Partial Content" response) by providing data, associated with the byte range(s) that need to be repaired, to user device 205. As shown by reference number 560, user device 205 can receive and utilize the data associated with the byte range(s) to repair the portions (e.g., segments) of the file. In some implementations, user device 205 can perform the repair while other packets of the file are being received (and/or while byte ranges, of such other packets, that need to be repaired are being identified). In this way, user device 205 can request and obtain data, associated with byte range(s) that need to be repaired, during the file delivery process, without having to wait for the file schedule to end. In some implementations, if a file repair threshold (e.g., specified in a provisioning profile associated with the file and relating to a maximum amount of data loss or damage in excess of which file repair is to be aborted) is satisfied, user device 205 can abort the file repair process and perform one or more actions to obtain the file and/or the damaged or missing portions of the file via unicast.

As shown by reference number 565, file delivery is complete (e.g., a time associated with the file schedule is reached). As shown by reference number 570, user device 205 can perform final processing and complete the combining of the file portions to derive the file.

Although process 500 has been described herein with respect to delivery and byte range file repair of a single file, process 500 can be adapted to facilitate delivery and byte range file repair of multiple files. For example, in a case where multiple files (e.g., discrete content files) are to be delivered (e.g., per NB API addContent request) via multicast, BMSC 230 can provide separate FDTs for the files. In this case, the steps of process 500 shown by reference numbers 505-530 and 540-570 can be the same, but the step shown by reference number 535 can include adding content and byte range file repair information for the multiple files (rather than for a single file). Furthermore, in this case, steps 540-570 can repeat after delivery of each of the multiple files is complete (e.g., after delivery of a first file is complete, steps 540-570 can be repeated for the second file, and so on). In this way, user device 205 can perform real-time file repair even in cases where multiple files are being delivered via multicast.

As indicated above, FIGS. 5A and 5B are provided merely as examples. Other examples are possible and can differ from what was described with regard to FIGS. 5A and 5B.

Some implementations, described herein, provide a user device 205 that is capable of performing real-time repair of a file being provided via multicast. In some implementations, user device 205 is capable of performing the repair without having to wait for the file delivery process to complete (and without having to wait for an offset time interval to expire). In this way, user device 205 can repair received portions of a file as other portions of the file are being received, which enables user device 205 to identify and address issues with the file in real-time during the file delivery process. This permits user device 205 to utilize the file much more quickly upon completion of the file delivery process, and reduces or eliminates the possibility of a delivery failure that might otherwise occur as a result of undue delay in repairing the file, which conserves network resources. Furthermore, this reduces or eliminates a need for user device 205 to receive, process, and store damaged or unusable files, which conserves power, computing resources, and memory resources of user device 205.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a packet, of a plurality of packets relating to a file being delivered via multicast, and a file delivery table associated with the file,
the file delivery table including:
a plurality of uniform resource identifiers,
the plurality of uniform resource identifiers corresponding
to respective sources of the file;
determine that one or more portions of the file, that are included in the packet, are in need of repair after receiving the packet;
initiate a timer;
provide, to a respective source corresponding to a uniform resource identifier of the plurality of uniform resource identifiers, a request for data relating to the one or more portions of the file based on an expiration of the timer;
reinitiate the timer upon providing the request or after providing the request;

determine, after receiving a different packet, that a different portion of the file, that is included in the different packet of the plurality of packets, is in need of repair; and provide, to one of the respective sources, based on determining that the different portion of the file is in need of repair, and while one or more additional packets of the plurality of packets are being received, an additional request for data relating to the different portion of the file, the additional request being based on an expiration of the reinitiated timer.

2. The device of claim 1, wherein the plurality of packets are delivered in accordance with a file schedule; and wherein the one or more processors, when providing the request, are to:

provide the request prior to a time at which the file schedule ends.

3. The device of claim 1, wherein the one or more processors, when receiving the data, are to:

receive the data while at least one other packet of the plurality of packets is being received.

4. The device of claim 1, wherein the one or more processors are further to:

provide, prior to providing the request, an initial request to a different respective source corresponding to a different uniform resource identifier of the plurality of uniform resource identifiers; and wherein the one or more processors, when providing the request, are to:

provide the request based on a failure to receive a response from the different respective source.

5. The device of claim 1, wherein the one or more portions of the file correspond to one or more byte ranges of the file; and wherein the one or more processors, when providing the request, are to:

provide information regarding the one or more byte ranges to the respective source.

6. The device of claim 1, wherein the one or more processors are further to:

decode content in the packet based on receiving the packet.

7. The device of claim 1, wherein the one or more portions of the file include multiple file segments; and wherein the one or more processors are further to:

track and/or identify one or more affected file segments of the multiple file segments.

8. A non-transitory computer-readable medium storing instructions, the instructions comprising:

one or more instructions that, when executed by one or more processors, cause the one or more processors to:

receive a packet, of a plurality of packets relating to a file being delivered via multicast, and a file delivery table associated with the file, the file delivery table including:

a plurality of uniform resource identifiers, the plurality of uniform resource identifiers corresponding to respective sources of the file;

determine that one or more portions of the file, that are included in the packet, are in need of repair after receiving the packet;

initiate a timer;

provide, to a respective source corresponding to a uniform resource identifier of the plurality of uniform resource identifiers, a request for data relating to the one or more portions of the file based on an expiration of the timer;

reinitiate the timer upon providing the request or after providing the request;

determine, after receiving a different packet, that a different portion of the file, that is included in the different packet of the plurality of packets, is in need of repair; and provide, to one of the respective sources, based on determining that the different portion of the file is in need of repair, and while one or more additional packets of the plurality of packets are being received, an additional request for data relating to the different portion of the file, the additional request being based on an expiration of the reinitiated timer.

9. The non-transitory computer-readable medium of claim 8, wherein the plurality of packets are delivered in accordance with a file schedule; and wherein the one or more instructions, that cause the one or more processors to provide the request, cause the one or more processors to:

provide the request prior to a time at which the file schedule ends.

10. The non-transitory computer-readable medium of claim 8, wherein the one or more instructions, that cause the one or more processors to receive the data, cause the one or more processors to:

receive the data while at least one other packet of the plurality of packets is being received.

11. The non-transitory computer-readable medium of claim 8, wherein the one or more instructions, when executed by the one or more processors, further cause the one or more processors to:

provide, prior to providing the request, an initial request to a different respective source corresponding to a different uniform resource identifier of the plurality of uniform resource identifiers; and wherein the one or more instructions, that cause the one or more processors to provide the request, cause the one or more processors to:

provide the request based on a failure to receive a response from the different respective source.

12. The non-transitory computer-readable medium of claim 8, wherein the one or more portions of the file correspond to one or more byte ranges of the file; and wherein the one or more instructions, that cause the one or more processors to provide the request, cause the one or more processors to:

provide information regarding the one or more byte ranges to the respective source.

13. The non-transitory computer-readable medium of claim 8, wherein the one or more instructions, when executed by the one or more processors, further cause the one or more processors to:

decode content in the packet based on receiving the packet.

14. The non-transitory computer-readable medium of claim 8, wherein the one or more portions of the file include multiple file segments; and wherein the one or more instructions, when executed by the one or more processors, further cause the one or more processors to:

track and/or identify one or more affected file segments of the multiple file segments.

15. A method, comprising:
receiving, by a device, a packet, of a plurality of packets relating to a file being delivered via multicast, and a file delivery table associated with the file,
the file delivery table including:
a plurality of uniform resource identifiers,
the plurality of uniform resource identifiers corresponding to respective sources of the file;
determining, by the device, that one or more portions of the file, that are included in the packet, are in need of repair after receiving the packet;
initiating, by the device, a timer;
providing, by the device, to a respective source corresponding to a uniform resource identifier of the plurality of uniform resource identifiers, a request for data relating to the one or more portions of the file based on an expiration of the timer;
reinitiating, by the device, the timer upon providing the request or after providing the request;
determining, by the device and after receiving a different packet, that a different portion of the file, that is included in the different packet of the plurality of packets, is in need of repair; and
providing, by the device and to one of the respective sources, based on determining that the different portion of the file is in need of repair and while one or more additional packets of the plurality of packets are being received, an additional request for data relating to the different portion of the file, the additional request being based on an expiration of the reinitiated timer.

16. The method of claim 15, wherein the plurality of packets are delivered in accordance with a file schedule; and
wherein providing the request comprises:
providing the request prior to a time at which the file schedule ends.

17. The method of claim 15, wherein receiving the data comprises:
receiving the data while at least one other packet of the plurality of packets is being received.

18. The method of claim 15, further comprising:
providing, prior to providing the request, an initial request to a different respective source corresponding to a different uniform resource identifier of the plurality of uniform resource identifiers; and
wherein providing the request comprises:
providing the request based on a failure to receive a response from the different respective source.

19. The method of claim 15, further comprising:
decoding content in the packet based on receiving the packet.

20. The method of claim 15, wherein the one or more portions of the file include multiple file segments; and
wherein the method further comprises:
tracking and/or identifying one or more affected file segments of the multiple file segments.

\* \* \* \* \*